June 8, 1943.  D. G. REMPEL  2,321,319
METHOD AND APPARATUS FOR MAKING
HOLLOW RUBBER ARTICLES
Filed April 17, 1940  3 Sheets-Sheet 2
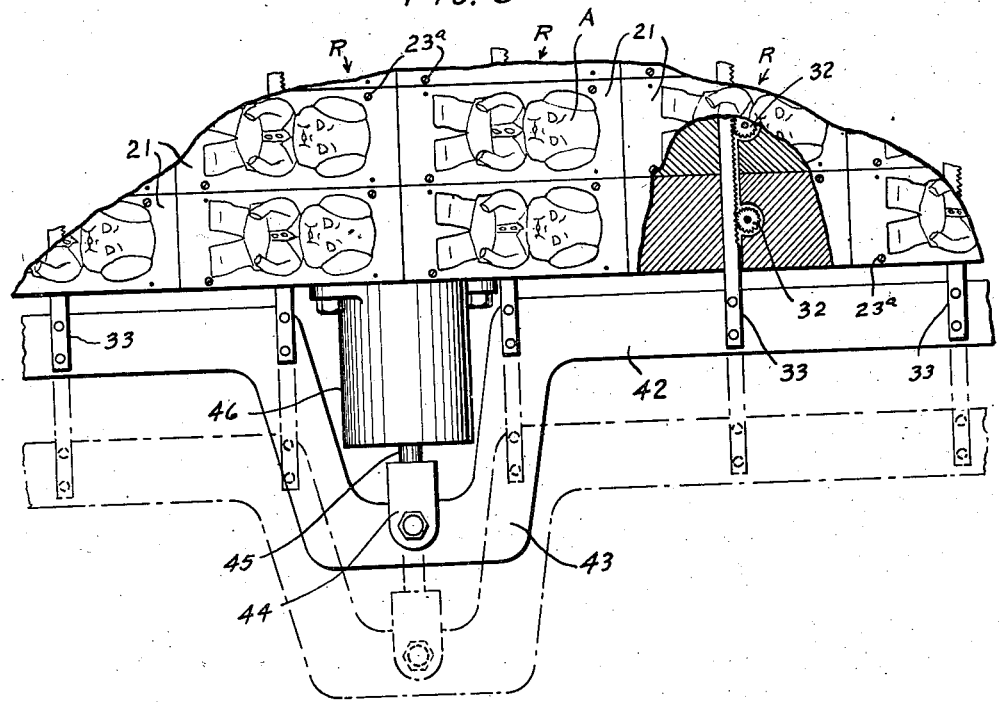
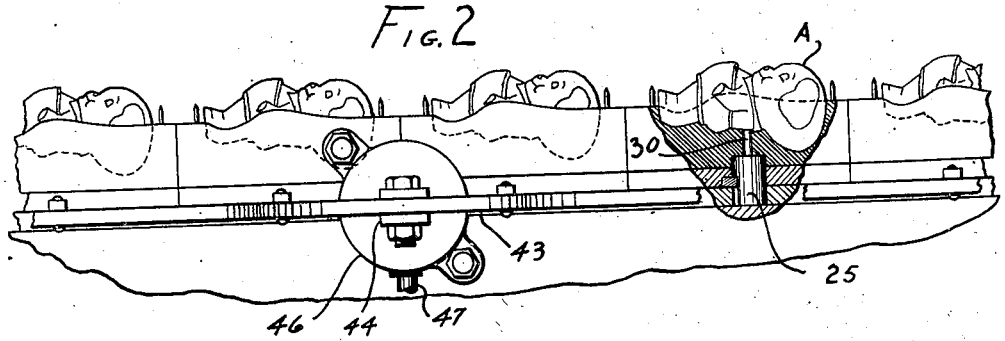
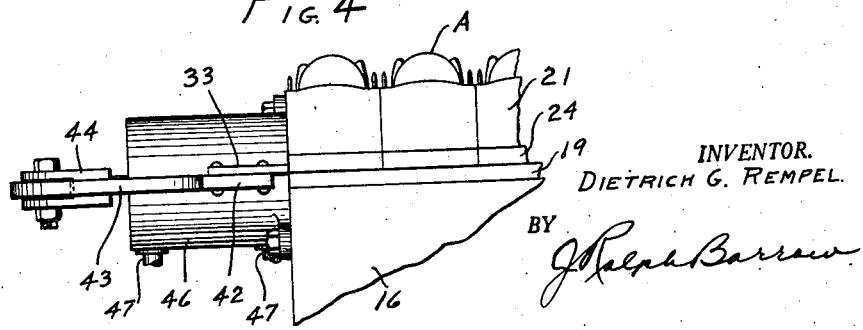
INVENTOR.
DIETRICH G. REMPEL.
BY

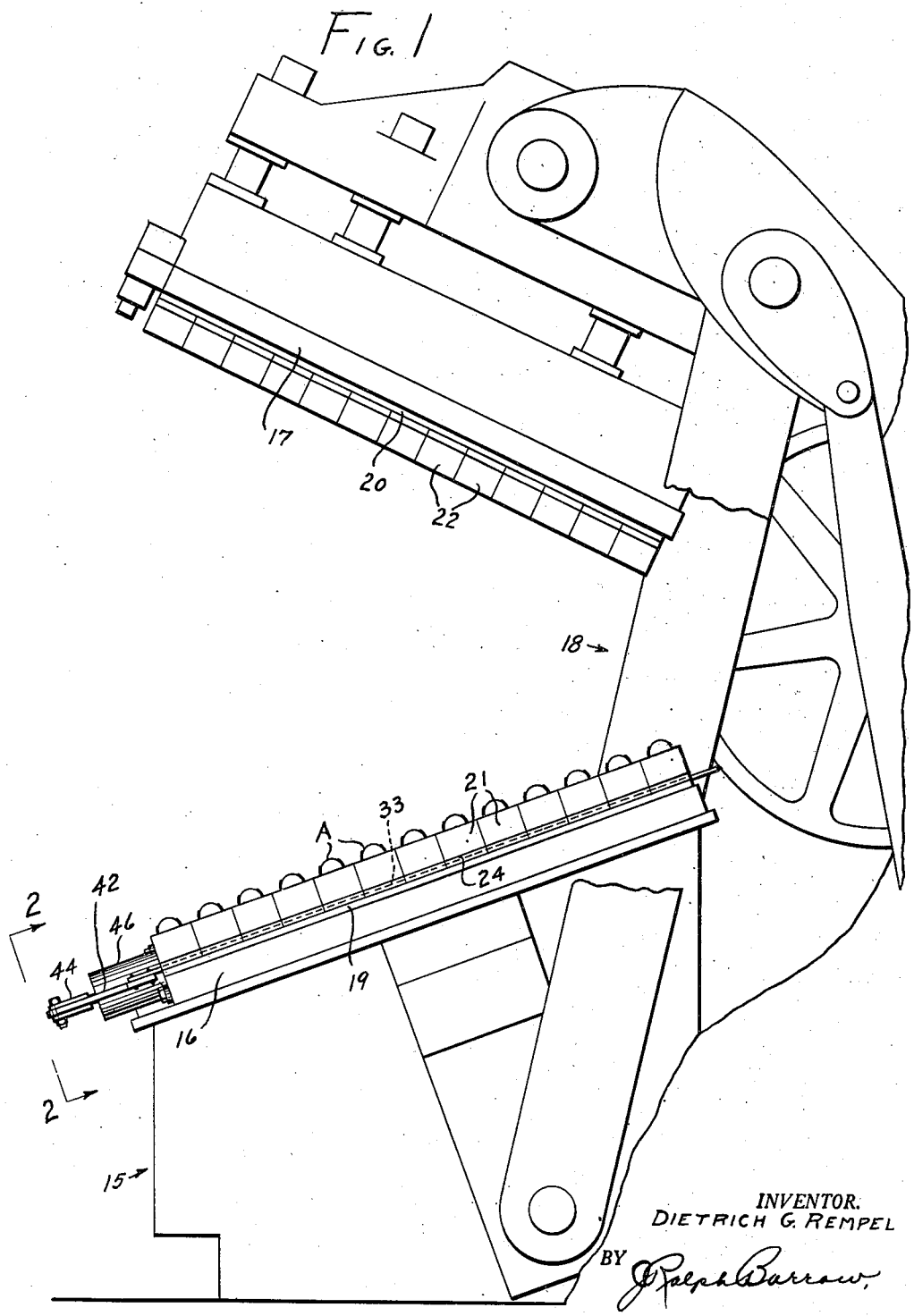

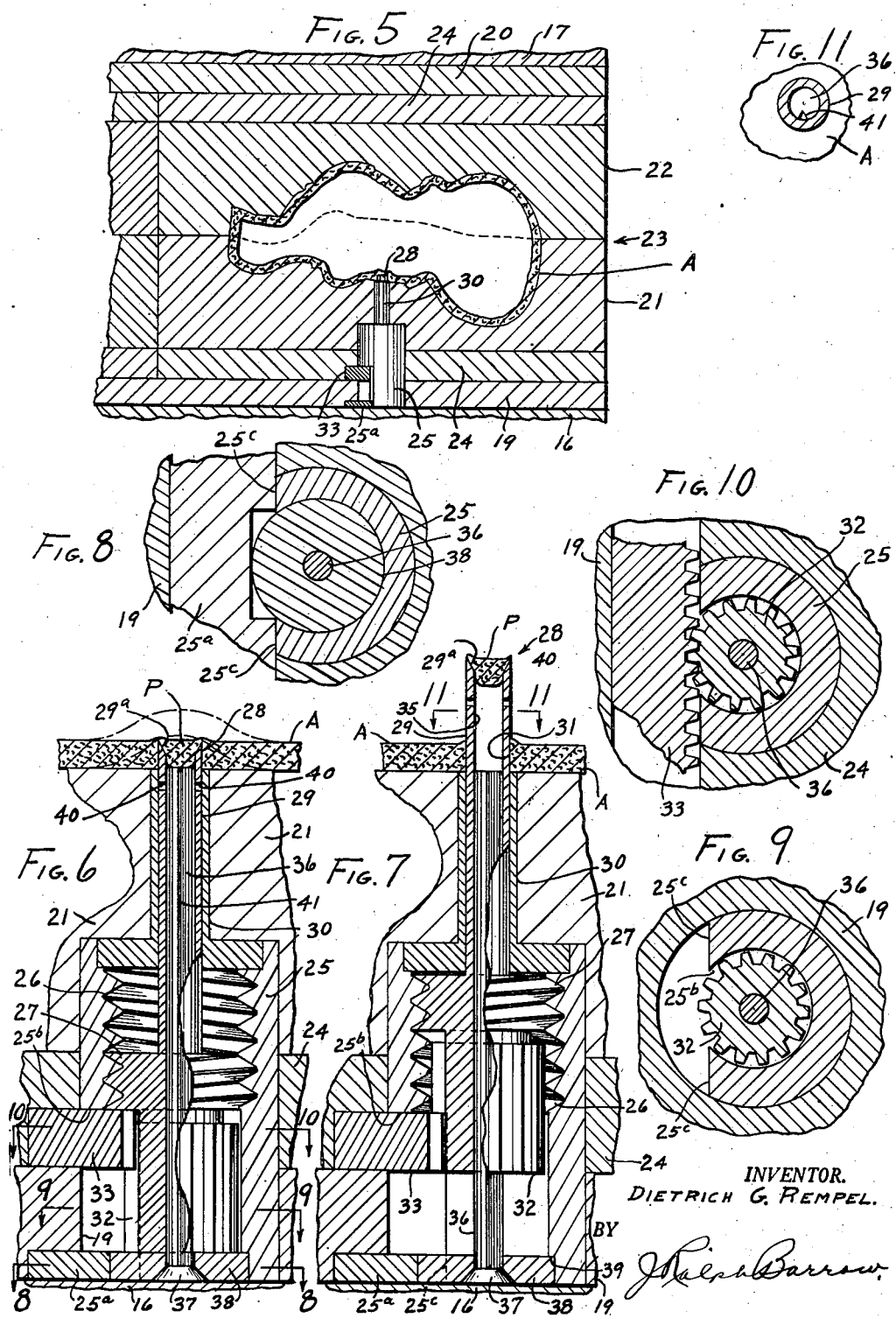

Patented June 8, 1943

2,321,319

UNITED STATES PATENT OFFICE 2,321,319

METHOD AND APPARATUS FOR MAKING HOLLOW RUBBER ARTICLES

Dietrich G. Rempel, Barberton, Ohio, assignor to The Sun Rubber Company, Barberton, Ohio, a corporation of Ohio Application April 17, 1940, Serial No. 330,101

11 Claims. (Cl. 18—19)

This invention relates to method and apparatus for manufacturing hollow rubber articles, such as hollow rubber character dolls, or the like.

Heretofore, such hollow rubber articles have been manufactured by providing a preformed biscuit comprising two sheets of raw rubber formed roughly in the shape of an article to be manufactured with the marginal edges of the sheets adhering and a pellet of volatile material, such as an ammonia compound, being incorporated within the biscuit; placing this biscuit in a sectional mold; heating the mold to vulcanizing temperature to volatilize the pellet and increase the pressure in the biscuit, thereby expanding the walls of the biscuit against the cavity surfaces of the mold. This curing process, however, required a considerable period of time because the mold had to cool to reduce the pressure in the article before the mold could safely be opened.

An object of the invention is to provide a method and apparatus of the character described in which the internal pressure of the article may be released after the vulcanizing period to permit the mold to be safely opened, without waiting for the mold or the article to cool, thereby materially increasing the production rate of such articles, and consequently reducing the production costs thereof.

Another object of the invention is to provide apparatus of the character described having improved means operable at will, while the vulcanizing mold is closed for the vulcanizing cycle, for accurately perforating hollow rubber articles in the mold.

These and other objects of the invention will be manifest from the following brief description and the accompanying drawings.

Of the accompanying drawings:

Figure 1 is a side elevation, partly broken away, of a vulcanizing press having the apparatus embodying the invention incorporated therein, the press being shown in open position.

Figure 2 is a fragmentary front elevation, partly broken away and in section, taken substantially at line 2—2 of Figure 1, and illustrating the improved article perforating mechanism in association with the lower mold sections in the press.

Figure 3 is a plan view, partly broken away and in section, of the portion of the apparatus shown in Figure 2.

Figure 4 is a fragmentary end view thereof, as viewed from the side of the press.

Figure 5 is a fragmentary cross-section through one of the sectional mold units in the press closed position thereof and illustrating a perforating device in association with the lower section of said mold unit.

Figure 6 is an enlarged cross-section through one of the article perforating devices after internal pressure has been applied within an article under heat of vulcanization in the mold unit.

Figure 7 is a cross-section similar to Figure 6, illustrating the manner in which the perforation is cut in an article by the rotary cutter.

Figures 8, 9 and 10 are cross-sections taken substantially on lines 8—8, 9—9, 10—10, respectively, of Figure 6.

Figure 11 is a cross-section taken on line 11—11 of Figure 7.

Referring to the drawings, the numeral 15 designates a vulcanizing press of known type, comprising a fixed lower platen 16 and a relatively movable upper platen 17, the press supporting and operating mechanism being indicated generally at 18. The platens 16 and 17 may be heated to vulcanizing temperature by suitable means (not shown).

Removably secured to platens 16 and 17 are plates 19 and 20, respectively, to which may be secured by means of screws 23ª, 23ª, lower and upper registering sections 21, 21 and 22, 22, respectively, of a plurality of cavity mold units 23, 23 (see Figure 5). The press mechanism 18 is operable to move the upper sections 22 on platen 17 toward and from registry with the lower sections 21 on platen 16. Removably and replaceably secured to the bottom and top faces of mold sections 21 and 22, respectively, may be plates 24, 24 for adjusting the sections relative to the supporting plates 19 and 20 thereof.

Referring to Figures 5 to 11, a sleeve 25 may be fixed in the bottom of each lower section 21, the upper part of said sleeve being internally threaded at 26 for receiving an enlarged threaded portion 27 of a rotary cutter 28, the latter having a cylindrical stem 29 slidably and rotatably received in a bushing 30 mounted in the said section, and the inner end of the stem being counter-sunk at 29ª to provide a sharp annular cutting edge. Stem 29 may normally be arranged to project into the cavity of the mold a sufficient distance that internal pressure within an article A in the mold, during the vulcanizing period, will urge the wall of the article against the mold surfaces and against the cutting edge of the stem, partially to cut an aperture 31 in the article. A bar or key 25ª may be firmly engaged between plate 19 and lower platen 16, as shown, to engage in a cut-out portion 25ᵇ in the lower end of sleeve 25, the inner edge of the bar engaging flat portions 25ᶜ, formed on the sleeve by said cut-out portion, to prevent rotation of the sleeve relative to the mold section 21.

For rotating the cutter 28 and simultaneously shifting the same to cut the aperture 31 in the wall of the article, the lower end of the cutter may have a pinion 32 integral thereon, engaging a rack 33 slidably mounted between the lower plate 19 and plates 24 of lower mold sections 21, one of these racks 33 being provided in association with each row R of said sections and engaging pinions 32, 32, on the rotary cutters in each mold section 21. The arrangement as shown is such that forward movement of racks 33 relatively of the press will engage pinions 32 to rotate cutter 28, and with this rotation the threaded portions 27 of the cutter will engage the threads 26 of sleeve 25 to shift the cutter in bushing 30, upwardly from the position thereof shown in Figure 6 to the position shown in Figure 7. Thus the cutting edge of rotating stem 29 in moving to projecting relation through the wall of the article A will cut a plug P from said wall, this plug engaging in the seat 29ª at the inner end of the stem to be lifted from the aperture 31, as shown in Figure 7.

The bore 35 of stem 29 may be extended through the entire cutter to receive a pin 36, the inner end of which extends to adjacent the cavity surface of the mold section 21, and the other end of the pin having a head 37 engaging in a counter-sunk hole in a disc 38, this disc being engaged between a shoulder portion 39 on sleeve 25 and the face of lower platen 16. The disc 38 is adapted to retain the pin 37 in fixed position relative to the sliding movement of cutter 28.

The stem 29 may be provided with apertures 40, 40 communicating the bore 35 thereof with the interior of article A in the mold when the stem is in the projecting relation shown in Figure 7. The apertures 40 are located to be beneath the plug P received in the seat 29ª in said projecting position, but may be closed off between the surfaces of bushing 30 and pin 36 in the withdrawn position of the cutter shown in Figure 6. The pin 36 may be provided with a longitudinally extending groove 41, communicating the upper portion of bore 35 with the exterior, for relieving the internal pressure of the article when desired upon cutting the aperture 31 in the article A (see Figure 7). Groove 41 is relatively small so that rubber will not enter the same to clog it during the vulcanizing cycle.

The arrangement of the rotary cutters and the associated parts thereof, as best viewed in Figures 6 to 10, is such that by removing plate 19 with the lower mold sections 21 thereon from the lower platen 16, and by removing racks 33, the various parts of each unit including sleeve 25, cutter 28, bushing 30, pin 36, disc 38, and bars 25ª, etc., may readily be removed, as for cleaning the same.

As best shown in Figures 1, 2, 3 and 4, the front ends of the racks 33, cooperating with the respective rows R of mold sections, may be secured to a laterally extending cross-bar 42. At the center of the cross-bar may be an outwardly extending U-shaped portion 43, to which is pivotally connected a bifurcated head 44 on the end of piston-rod 45 of a cylinder 46, which is secured to relatively fixed portions of the press structure.

Piping 47, 47 connects cylinder 46 to a suitable source of fluid-pressure supply, the cylinder being operable at will through a valve (not shown), to shift the racks 33 forwardly and rearwardly as indicated in full and chain-dotted lines in Figure 3, to move cutter 28 toward and from the inwardly projecting positions thereof shown in Figure 7.

In the operation of the apparatus, which in the present case is adapted for vulcanizing blown rubber articles, such as hollow rubber character dolls, or the like, uncured articles A are first placed in the cavities of the lower mold sections 21, these articles having been preformed in known manner, as by adhering two sheets of raw rubber to form a "biscuit" roughly in the shape of the finished article to be manufactured, and with a pellet of volatile material within the biscuits, as previously described. The press is next closed with the lower and upper mold sections 21 and 22 in registry, as illustrated in Figure 5, and the platens are heated to vulcanizing temperature, which causes the pellets in the article "biscuits" to expand the walls thereof against the surfaces of the mold cavities. This expansion urges a portion of the wall of each article against the partially projecting ends of stems 29 of the respective cutters 28, partially to cut apertures 31 in the articles.

At the end of the vulcanizing cycle, before the press is opened, cylinder 46 is actuated to move the racks 33 forwardly in unison, from the full-line positions to the chain-dotted positions shown in Figure 3. With this forward movement, the racks 33 engaging the pinions 32 of cutters 28 cause the cutters to rotate, whereby rotational movement is imparted to the threaded portions 27 of the cutters in the threaded portions 26 of the relatively fixed sleeves 25, to cause the rotating cutters to move inwardly of the mold to project the stems 29 through the wall of the articles A to form apertures 31 therein. The plugs P from the apertures are engaged in the seats 29ª at the ends of stems 29 and lifted free of the apertures. The inward rotational movement of the cutters 28 cutting through the hot rubber of the articles forms apertures 31 as accurately as could be drilled or punched against a solid surface.

Substantially simultaneously with inward movement of stems 29 the fluid pressure within the articles A is vented through the apertures 40 in the stems 29, and thence vented through the grooves 41 in the pins 41 to the atmosphere. This allows the vulcanized articles A in the molds 23 to cool rapidly, the heat to the platens 16 and 17 preferably having been shut off, and permits opening of the press and removal of the articles therefrom substantially at the end of the vulcanizing period, thereby eliminating the usual procedure of waiting for the molds to cool before opening the press. The apertures 31 in the finished articles A may be utilized for receiving noisemakers of known type.

As soon as the vulcanized articles A are all removed from the lower mold sections 21, the cylinder 46 may be operated to move the cross-bar 42 inwardly from the chain-dotted to the full-line positions shown in Figure 3, thereby withdrawing the rotary cutters 28 from the fully projecting positions thereof shown in Figure 7 to the partially projecting position shown in Figure 6, when the procedure described may be repeated for vulcanizing another batch of articles.

Thus has been provided improved mechanism for effectively and efficiently cutting apertures in hollow rubber articles during the vulcanizing cycle thereof, said apertures being utilized in cooperation with cutter mechanism to relieve the internal pressure within the articles while still hot, to permit opening the molds substantially as soon as the vulcanizing cycle is completed, and thereby materially increasing the production rate for manufacturing the articles and consequently reducing the manufacturing costs thereof.

Modifications of the invention may be resorted to without departing from the spirit thereof or the scope of the appended claims.

What is claimed is:

1. The combination with a mold structure having a plurality of cavities therein for forming hollow rubber or like articles by means of internal pressure, of rotary cutters shiftably mounted in association with each of said cavities, means operable at will to shift said cutters in unison toward and from positions in which they project inwardly of the respective cavity surfaces a distance of at least the thickness of the wall of articles formed therein, and means actuated by said cutter-shifting means for rotating said cutters to cut apertures through the walls of the hollow articles formed in said cavities.

2. The combination with a multiple cavity mold for forming hollow rubber or like articles, the cavities of said mold being arranged in rows each containing a plurality of cavities, of rotary cutters shiftably mounted in association with each of said cavities, means on each of said cutters adapted to be engaged to shift the cutters toward and from positions in which they project inwardly of the respective cavity surfaces a distance of at least the thickness of the wall of articles formed therein, actuating means associated with each of said rows of cavities for engaging each of said cuter-shifting means in the respective rows, means for operating the actuating means of each of said rows in unison, and means for rotating the cutters in unison with inward shifting thereof.

3. The combination with a cavity mold for vulcanizing hollow rubber articles, in which preformed biscuits of uncured rubber are formed to the shape of the mold cavity by expansion of gas within said biscuit under the influence of heat of vulcanization, of a rotary cutter mounted in said mold to project into said cavity, and means for rotating said cutter to cut an aperture in the wall of an article formed in said mold, and means associated with said cutter for evacuating said article in the mold through the aperture cut in the article.

4. The combination with a cavity mold for vulcanizing hollow rubber articles or the like, in which preformed biscuits of uncured rubber are formed to the shape of the mold cavity by expansion of gas within said biscuit under the influence of heat of vulcanization, of a rotary cutter shiftably and rotatably mounted in said mold, cooperating means on said mold and said cutter for shifting the latter relatively of said cutter, means for rotating said cutter as it is shifted toward said cavity to cut an aperture in an article in said mold, and means in said cutter for evacuating an article in said mold through an aperture formed by the cutter.

5. The combination with a cavity mold for making hollow rubber articles or the like by means of internal pressure therein, of a rotary cutter shiftably and rotatably mounted in said mold, a portion of said cutter being threaded in said mold, and means operable at will to rotate said cutter in either direction, thereby engaging said threaded portions to shift the cutter relatively of said cavity, said cutter thereby being shiftable while rotating to cut an aperture in the wall of an article in the mold cavity while said wall is held against the surface of the mold cavity by the internal pressure of the article.

6. The method of making blown rubber articles which comprises providing a preformed hollow article of raw rubber in a plural-part cavity mold, vulcanizing said article under the influence of heat and internal fluid pressure, and applying a cutting tool to the wall of the article while the same is expanded against the surface of the mold cavity by said internal pressure whereby a portion of said wall is removed to provide an aperture through which the article is evacuated without opening the mold.

7. The method of making blown rubber articles which comprises providing a preformed hollow article of raw rubber in a plural-part cavity mold having a cutting tool projecting into the cavity, vulcanizing the article in the mold by application of heat to the mold while fluid under pressure is provided in the article to expand the walls thereof against the surface of the mold cavity, said internal pressure initially urging the wall of the article against the cutting tool to cut an aperture partially through the wall thereof, and subsequently after vulcanization is completed urging the cutting tool inwardly of the mold against said pressure expanded wall to cut out a portion of the wall to provide an aperture through which the article is evacuated without opening the mold.

8. The combination with a cavity mold for vulcanizing hollow rubber articles by means of internal fluid-pressure, of a rotary cutter shiftably and rotatably mounted in said mold, said cutter normally projecting into said cavity a sufficient distance to cut an aperture partially through the wall of an article in the mold upon the internal pressure applied within the article urging the wall thereof against the mold surfaces and against said normally projecting portion of the cutter, and means operable at will to rotate and simultaneously to shift said cutter inwardly of the mold cavity to cut a partially cut aperture completely through the wall of an article.

9. The combination with a cavity mold for vulcanizing hollow rubber articles by means of internal fluid-pressure, of a rotary cutter shiftably and rotatably mounted in said mold, said cutter projecting into said cavity partially to cut an aperture in an article therein upon the internal pressure applied within the article urging the wall thereof against the mold surfaces and against the cutter, and means operable at will to rotate and simultaneously to shift said cutter inwardly of said mold to cut out a portion of the wall of the article to form said aperture, and a vent in said cutter adapted to communicate with the interior of the article when the cutter is shifted to cut out said aperture therein, thereby to relieve the internal pressure in the article.

10. The combination with a cavity mold for vulcanizing hollow rubber articles by means of internal fluid-pressure, of a rotary cutter shiftably and rotatably mounted in said mold, means operable at will to rotate said cutter and simultaneously to shift the same to project through the wall of an article in the mold against the internal pressure thereof, and thereby cutting an aperture in said wall, said cutter having a seat thereon for receiving the plug cut from said wall, said cutter having a vent beneath said seat adapted to relieve the internal pressure in said article when the cutter is in said projecting position.

11. The combination with a cavity mold for vulcanizing hollow rubber articles by means of internal fluid-pressure, of a cutter shiftably mounted in said mold, means operable at will simultaneously to shift said cutter to project through the wall of an article in the mold against the internal pressure thereof, and thereby cutting an aperture in said wall, said cutter having a seat thereon for receiving the plug cut from said wall, said cutter having a vent beneath said seat adapted to relieve the internal pressure in said article when the cutter is in said projecting position.

DIETRICH G. REMPEL.